United States Patent [19]

Harper, Jr.

[11] Patent Number: 4,618,512
[45] Date of Patent: * Oct. 21, 1986

[54] PROCESS TO IMPART SMOOTH-DRY AND FLAME RETARDANT PROPERTIES TO SYNTHETIC-CELLULOSIC BLENDED FABRICS

[75] Inventor: Robert J. Harper, Jr., Metairie, La.

[73] Assignee: The United States of America as represented by the Secretary of Agriculture, Washington, D.C.

[ * ] Notice: The portion of the term of this patent subsequent to Aug. 20, 2002 has been disclaimed.

[21] Appl. No.: 749,905

[22] Filed: Jun. 28, 1985

Related U.S. Application Data

[63] Continuation-in-part of Ser. No. 586,617, Mar. 6, 1984, Pat. No. 4,536,422.

[51] Int. Cl.$^4$ ............... B05D 3/02; D06M 13/34
[52] U.S. Cl. .................................. 427/381; 8/181; 8/182; 427/387; 427/392; 427/393.3
[58] Field of Search .............. 8/181, 182; 427/381, 427/387, 392, 393.3

[56] References Cited

U.S. PATENT DOCUMENTS 3,771,957 11/1973 Vail ........................... 8/181 X
4,011,613 3/1977 Bertoniere et al. ......... 8/181 X Primary Examiner—Michael R. Lusignan
Attorney, Agent, or Firm—M. Howard Silverstein; David G. McConnell; Raymond C. Von Bodungen

[57] ABSTRACT

Synthetic-cellulosic blended fabric is padded with a solution of nitrogen rich N-methylol crosslinking agent, acid catalyst, antimony oxide and a halogen containing alcohol; dried at about 140°–190° F. and then cured at about 250°–400° F. for sufficient time to impart smooth-dry and flame retardant properties to the fabric. Aqueous polyethylene or silicone emulsion softeners can be added to the padding solution if desired. Dibromoneopentyl glycol makes an exemplary halogen containing alcohol. The process can be varied to first pad with antimony oxide, dry, and then repad with a solution of: nitrogen rich N-methylol crosslinking agent, acid catalyst, and a halogen containing alcohol, dry again and cure, at the above specified temperatures.

16 Claims, No Drawings

PROCESS TO IMPART SMOOTH-DRY AND FLAME RETARDANT PROPERTIES TO SYNTHETIC-CELLULOSIC BLENDED FABRICS

CROSS REFERENCE TO RELATED APPLICATIONS

This is a continuation-in-part of application Ser. No. 586,617 filed Mar. 6, 1984, now U.S. Pat. No. 4,536,422, patented Aug. 20, 1985.

BACKGROUND OF THE INVENTION

1. Field of the Invention

This invention relates to processes for imparting smooth-dry and flame retardancy to synthetic-cellulosic-blended fabrics.

2. Description of the Prior Art

Cellulose by itself or in blends with synthetic fibers does not possess either smooth-dry (DP) or flame retardant (FR) characteristics. In order for the cellulose component to acquire these properties, it must be given a chemical finish. In the case of smooth-dry prformance, this is achieved by crosslinking the cellulosic component using one of the well known cross-linking agents such as dimethylol dihydroxyethyleneurea.

It is well known that it is more difficult to make certain blended fabrics flame retardant than it is to make all-cellulosic fabrics flame retardant. Blended fabrics in this category are particularly those made from cellulose and polyester. Moreover, the degree of difficulty increases as the amount of polyester in the blend becomes larger. For this reason, a blend containing 50% polyester and 50% cellulose is difficult to make flame retardant.

In the case of flame retardancy, performance is achieved by applying finishes that add concentrations of compounds that contain elements which have been found to be effective in improving the fire resistance of cellulose. Two systems are frequently employed. One system is based on finishes that add a combination of phosphorus and nitrogen to the fabric while the second utilizes a combination of antimony and halogen.

In the case of phosphorus-nitrogen finishes, a well-known finish is the so-called THPOH-NH$_3$ [tetrakis(hydroxymethyl)phosphonium hydroxide-ammonia] finish. In this case, the THPOH is padded onto the fabric, the fabric is dried and the fabric is treated with gaseous ammonia. Subsequently, the fabric is oxidized. Attempts to give this fabric a durable-press finish by application of a crosslinking agent are generally unsuccessful because the crosslinking agent is reactive with the free -N-H groups in the THPOH-NH$_3$ polymer rather than the OH group of cellulose. Similarly, pretreatment of the fabric with crosslinking agent prior to FR finishing, generally renders the FR treatment ineffective.

The other systems utilized to make cellulose or its blends flame retardant are based upon the use of compounds containing antimony and halogen. Typically, the antimony is added to the blended fabric in the form of antimony oxide. The halogenated component is added either in the form of halogenated polymers or as in small discrete inert halogenated compounds such as decabromodiphenyl oxide. Both the antimony and small discrete halogenated compounds are retained on the blended fabrics by means of being trapped in the blended fabric by the use of added polymers in the finish. Polyacrylates are frequently used for this purpose. The high add-ons of polymers in this finish tends to lead to a stiff blended fabric.

SUMMARY OF THE INVENTION

A process for imparting smooth-dry and flame retardant properties to synthetic-cellulose blend fabrics is disclosed. A synthetic-cellulose blend fabric containing a minimum of 50% cellulose is padded with a solution comprising sufficient amounts of N-methylol crosslinking agent, an acid catalyst, a halogen containing alcohol and antimony oxide. The blend fabric is then dried until all of the moisture is driven off and cured at sufficient time and temperature to impart smooth-dry flame retardant properties to the blended fabric.

The process can be modified to first pad the synthetic-cellulose blend with a solution of antimony oxide, dry the fabric, and then repad with a solution of: nitrogen-rich N-methylol crosslinking agent, and acid catalyst, and a halogen containing alcohol, dry again, and cure at sufficient time and temperature to impart smooth-dry flame retardant properties to the blended fabric.

The same type process can be applied to polyester-cellulose or glass fiber-cellulose blends as well as to all cellulosic fabrics.

DESCRIPTION OF THE PREFERRED EMBODIMENTS

In order to produce flame retardant cellulose-blend fabrics with smooth dry properties, a finish which contains crosslinking agents or combination of crosslinking agents, a halogenated alcohol or polyol which is co-reactive with crosslinking agents, antimony oxide and auxiliaries such as softeners, catalysts for solvents is used. The role of these crosslinking agents is fourfold. First, the crosslinking agent reacts with the cellulose compound in the blended fabric to impart required resiliency. Second, it functions as a binding agent to help in the retention of antimony oxide used in the finish. Third, it reacts chemically with the halogenated alcohol used in this finish to bind the alcohol into the cotton substrate and finally it imparts nitrogen to the fabric, thus increasing overall flame resistance.

From a chemical point of view, the unique characteristic of this finish is the interaction between the cellulose fiber, crosslinking agent and halogenated alcohol to produce a chemical matrix in which all three components are chemically bound together. In this finish it is advantageous to use agents such as dimethylol dihydroxyethyleneurea (DMDHEU), trimethylol melamine (TMM) or trimethylol acetylenediureine (MACD) because they possess several reactive sites. The methylol-melamines and methylolacetylenediureine (MACD) possess added nitrogen content. Representative structures of these agents are listed.

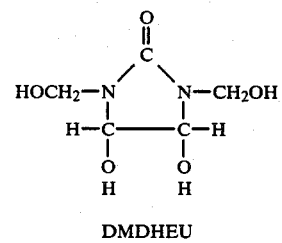

DMDHEU

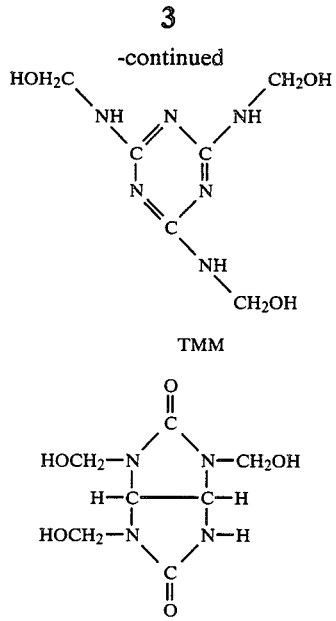

TMM

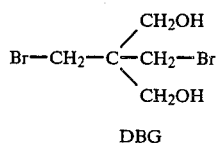

The second major component in this finish is the halogenated alcohol. The specific compound selected for this purpose was dibromoneopentyl glycol (DBG). This material contains two bromine atoms and two reactive alcohol sites and only five carbon atoms. As such, it contains 61% bromine.

Br—CH$_2$—C(CH$_2$OH)(CH$_2$OH)—CH$_2$—Br

DBG

The reaction between the cellulose components in the blended fabric crosslinking agent, and alcohol (ROH) can be represented in the following manner recognizing that a given crosslinking reaction can occur at any two of the reaction sites.

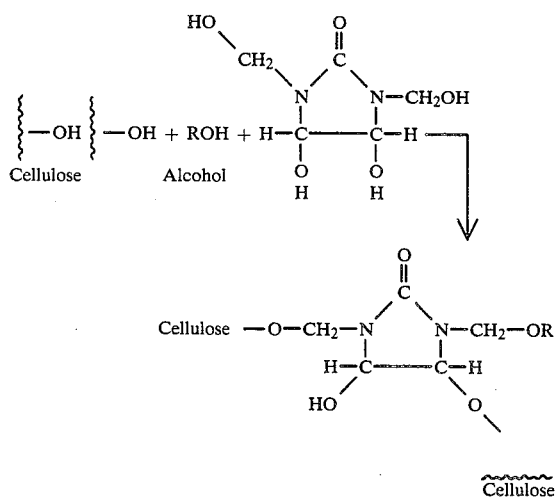

The third major component in the finish is antimony oxide. Its retention on a blended fabric is achieved primarily by means of the trapping and polymer forming action of the crosslinking agent. Also included in some of the finishes are softeners such as polyethylene or silicone, but these materials do not appear to make a significant difference in overall antimony retention after one or 25 launderings, although polyethylene should be beneficial for this purpose.

Some comments should be made as to the mode of effectiveness of this finish. First, to be a useful FR-DP finish, the chemical agents used to produce desired properties must be retained through a number of launderings. In the preferred embodiment the properties after 25 launderings are reported because this demonstrates performance after what would be extended usage. Properties focused on are retention of elements that impart flame retardancy such as halogen, antimony and nitrogen contents, tests designed to show flame retardancy such as oxygen index (OI) or standard vertical flame test and measurement of smooth dry performance such as DP rating.

In the case of oxygen index (OI), untreated cellulose-blended fabrics have an OI of 0.18. Flame retardant treatments increase the oxygen index and it is generally recognized OI of 0.25 or higher is required if a fabric is to pass a standard vertical flame test. This latter test is a test used to measure whether or not a fabric is flame retardant. While an untreated cellulose-blend will be consumed entirely once ignited, a FR fabric must self-extinguish with a char length of not more than five inches if it is to be deemed flame retardant. In the case of DP ratings, untreated cellulose have DP ratings of 1.0 usually and increasing smooth dry ratings up to 5.0 reflect increasing fabric smoothness. While most commercial fabrics with only DP finishes approach a rating of 4.0, with a combination finish which would have a heavy chemical loading, a rating of 3.0 or higher would be deemed commercially acceptable.

In this invention, it is necessary to apply a chemical finish to a cellulose-containing substrate (fabric), dry and cure said fabric and wash to remove unreacted reagents.

In the examples given in this application, both one step and two step treatments are reported. The two step treatments were developed because with certain combinations of reagents, particularly in cases in which high levels of antimony oxide are employed, an instability arose because of interaction of reagents. In these cases the particular sequence employed with this invention is to pad the fabric first with an aqueous dispersion containing antimony oxide and a softener (optional ingredient in treatment, examples of softeners were polyethylene and silicones). Subsequent to padding, the fabric is padded with a solution containing crosslinking agent or agents, catalyst and dibromoneopentylglycol. Because the glycol is only soluble in water to a limited extent, it is necessary to use a solvent system containing equal amounts of ethanol-water. Other solvent systems could likewise be used as long as said systems would dissolve required chemical reagents.

While this particular invention is found to be most effective with the dibromoneopentyl glycol, other halogen-containing alcohols could likewise be used in this system.

The major advantages of this process over others based on halogen and antimony are twofold. First, no large quantity of surface polymers are required because all agents are nonpolymeric compounds, which should have good penetration into the synthetic blended cellulose. As such, this finish should avoid long term stiffness associated with many antimony-halogen finishes. Second, the halogenated compound being bound via a covalent chemical bond to the cellulose-containing substrate should possess better retention characteristics than that exhibited by distinct halogen compounds which are merely adsorbed or trapped on the synthetic blended cellulosic surface.

The utility of this invention is described in the following examples:

EXAMPLE 1

A pad bath (bath A) was prepared that contained 10% antimony oxide (colloidal), 0.1% wetting agent (ethoxylated alcohol) and the remainder water. A 50% cotton-50% polyester blend Lacoste knit was padded with pad bath A. The fabrics were then dried for 7 minutes at 140° F.

A second formulation (bath D) was prepared that contained 10% trimethylol melamine, 7% dimethylol dihydroxyethyleneurea, 20% dibromoneopentyl glycol, 0.8% zinc nitrate hexahydrate and 0.1% wetting agent (ethoxylated alcohol) dissolved in equal portions of alcohol-water. The fabric from the first step (antimony oxide treatment) was then padded in this formulation, dried for 7 minutes at 140° F., and cured for 4 minutes at 320° F. The fabric was then laundered 25 times and tested for various properties. The results, as given in Table I show that the blend fabrics possessed acceptable smooth dry and flame retardant characteristics after 25 launderings.

EXAMPLE 2

A pad bath (bath B) was prepared that contained 10% antimony oxide (colloidal), 0.5% polyethylene softener, and 0.1% wetting agent (ethoxylated alcohol) and the remainder water. The aqueous polyethylene emulsion softener used in this formulation was Velvetol OE, produced by Quaker Chemical, Conshohocken, Pa.

A 50% cotton-50% polyester blend Lacoste knit was padded with pad bath B. The fabric was then dried for 7 minutes at 140° F. Then the fabric was padded with pad bath D as in Example 1, then dried, cured, and laundered as in Example 1. Tests results for the various properties of this fabric are given in Table I. The results show that satisfactory FR-DP blend fabric durable to laundering was prepared by this process.

EXAMPLE 3

A pad bath (bath C) was prepared that contained 10% antimony oxide (colloidal), 1.0% silicone softener, 0.1% wetting agent (ethoxylated alcohol) and the remainder water. The aqueous based silicone softener used in this formulation was Dow Corning 1111, produced by Dow Corning Corp., Midland, Mich.

A 50% cotton-50% polyester blend Lactose knit was padded with bath C. The fabric was dried for 7 minutes at 140° F. Then, the fabric was padded with bath D as in Example 1, and then dried, cured, and laundered 25 times as in Example 1. Test values for various properties of fabric are given in Table I. These results show that this process produces a blend fabric with acceptable smooth dry and flame retardant characteristics after 25 launderings.

EXAMPLE 4

A 50% cotton-50% polyester blend Lacoste knit was padded with pad bath A (from Example 1). The fabric was then dried for 7 minutes at 140° F. A second formulation (bath E) was prepared that contained 8% trimethylol melamine, 7% dimethylol dihydroxyethyleneurea, 20% dibromoneopentyl glycol, 0.7% zinc nitrate hexahydrate, and 0.1% wetting agent (ethoxylated alcohol) dissolved in solvent prepared from equal quantities of ethanol and water.

The fabrics from the first step (antimony oxide treatment) were then padded with pad bath E, dried for 7 minutes at 140° F., and cured for 4 minutes at 320° F. This fabric was then laundered 25 times and tested for various properties. The results, as given in Table I show the blend fabric possessed acceptable smooth dry and flame retardant characteristics after 25 launderings.

EXAMPLE 5

A 50% cotton-50% polyester blend Lacoste knit was padded with pad bath B (as in Example 2). The fabric was dried for 7 minutes at 140° F. Then the fabric was padded with pad bath E as in Example 4, then dried, cured, and laundered as in Example 4. Test data for the various properties of this fabric are given in Table I. The results show that acceptable FR-DP blend fabric durable to laundering was prepared by this process.

EXAMPLE 6

A 50% cellulosic-50% polyester blend Lacoste knit was padded with bath C as in Example 3. This fabric was then dried for 7 minutes at 140° F. Then, the fabric was padded with bath E as in Example 4, and then dried, cured, and laundered 25 times as in Example 4. Tests for various properties of these fabrics are given in Table I. These results show that this process produced blend fabric with acceptable smooth dry and flame retardant characteristics after 25 launderings.

EXAMPLE 7

A padding solution was prepared that contained 10% dimethylol dihydroxyethyleneurea, 10% dimethylol dihydroxyethyleneurea, 10% trimethylol melamine, 0.9% zinc nitrate hexahydrate, 5% antimony oxide, 20% dibromoneopentyl glycol and 0.1% wetting agent dissolved in equal portions of alcohol-water to make 100%. A series of cotton-glass fiber plain jersey blends and a 100% cotton control were padded with this formulation, dried 5 min at 175° F. and cured for 4 min at 320° C. The fabrics were then laundered and line dried.

The glass fiber-cotton fabrics were core yarn fabrics in which the cores were 100 d, 198 d and 298 d glass fiber so that the overall blend levels contained 14%, 27% and 38% glass fiber After line drying, the blend fabrics had DP ratings of 4.1 and oxygen index valves of 43.5, 39.9 and 44.7 respectively. By comparison, cotton fabric with this same treatment had an O.I. of 36.9. These results demonstrate that smooth-dry, flame retardant cotton-glass fiber fabrics were produced using this finishing system. Moreover, the higher O.I. values of the blends shows that use of a flame retardant synthetic contributes to the level of flame retardancy of the blend after finishing.

TABLE I

PROPERTIES OF FABRICS FINISHED WITH SMOOTH DRY AND FLAME RETARDANT FINISH AFTER 25 LAUNDERINGS

| Example | Fabric | DP Rating | Vert Flame Test Char Length, in. | OI | % Br | % Sb | % N |
|---------|--------|-----------|----------------------------------|------|------|------|------|
| 1 | 50% Cotton - 50% Polyester Lacoste Knit | 3.4 | 3.29 | .254 | 3.74 | 1.80 | 2.91 |
| 2 | 50% Cotton - 50% Polyester Lacoste Knit | 3.7 | 3.38 | .260 | 3.68 | 1.77 | 3.01 |
| 3 | 50% Cotton - 50% Polyester Lacoste Knit | 4.0 | 3.50 | .268 | 3.23 | 2.01 | 2.90 |
| 4 | 50% Cotton - 50% Polyester Lacoste Knit | 3.5 | 3.21 | .247 | 3.55 | 2.24 | 2.60 |
| 5 | 50% Cotton - 50% Polyester Lacoste Knit | 3.8 | 4.88 | .258 | 3.38 | 1.73 | 2.64 |
| 6 | 50% Cotton - 50% Polyester Lacoste Knit | 4.0 | 4.38 | .245 | 2.93 | 2.29 | 2.48 |

I claim:

1. A process for imparting smooth-dry and flame retardant properties to synthetic-cellulose blend fabrics comprising:
   (a) padding a synthetic-cellulosic blend fabric, said fabric containing a minimum of 50% cellulose with a solution comprising sufficient amounts of N-methylol crosslinking agent, an acid catalyst, a halogen containing alcohol, and antimony oxide to produce smooth-dry, flame retardant properties in the blend fabric;
   (b) drying said cellulosic-blend fabric for sufficient time and at sufficient temperature to drive off the moisture; and then;
   (c) curing said blend fabric for sufficient time and temperature to impart smooth-dry, flame retardant properties to said blend fabric.

2. The process of claim 1 wherein the synthetic-cellulose blend fabric is a polyester-cotton blend fabric.

3. The process of claim 1 wherein the synthetic-cellulose blend is a glass fiber-cotton blend.

4. The process of claim 1 wherein the padding solution of step (a) includes an aqueous polyethylene emulsion or an aqueous silicone emulsion softener.

5. The process of claim 1 wherein the padding solution contains from about 5 to 20% nitrogen rich N-methylol crosslinking agent; 0.15 to 4% acid catalyst; 3 to 15% of antimony oxide, and 5 to 25% of a halogen containing alcohol.

6. The process of claim 1 wherein the halogen containing alcohol is glycol or polyol.

7. The process of claim 1 wherein the halogen containing alcohol is dibromoneopentyl glycol.

8. The process of claim 1 wherein the drying temperature is from about 140° to 190° F. and the curing temperature is from about 250° to 400° F.

9. A process for imparting smooth-dry flame retardant properties to synthetic-cellulosic blend fabric comprising:
   (a) padding a synthetic-cellulose blend fabric said fabric containing a minimum of 50% cellulose with a solution of 3% to 15% antimony oxide;
   (b) drying said blend fabric for sufficient time and temperature to drive off the moisture;
   (c) repadding said blend fabric with a solution comprising sufficient amounts of N-methylol crosslinking agent, an acid catalyst, a halogen containing alcohol to produce smooth-dry flame retardant properties in the blend fabric;
   (d) drying said fabric for sufficient time and temperature to drive off the moisture; and then,
   (e) curing said blend fabric for sufficient time and temperature to impart smooth-dry, flame retardant properties to said fabric.

10. The process of claim 9 wherein the padding solution in step (a) includes an aqueous polyethylene emulsion or an aqueous silicone emulsion softener.

11. The process of claim 9 wherein the synthetic component of said blend fabric is selected from the group consisting of: polyester and glass fiber amd the cellulose is cotton.

12. The process of claim 9 wherein the padding solution of step (a) contains from about 3 to 15% of antimony oxide.

13. The process of claim 9 wherein the repadding solution of step (c) contains from about 5 to 20% nitrogen rich N-methylol crosslinking agent; 0.15 to 4% of acid catalyst; 5 to 25% of a halogen containing alcohol.

14. The process of claim 9 wherein the halogen containing alcohol is glycol or polyol.

15. The process of claim 9 wherein the halogen containing alcohol is dibromoneopentyl glycol.

16. The process of claim 9 wherein the drying temperature is from 140° to 190° F. and the curing temperature is from about 250° to 400° F.

* * * * *